Dec. 3, 1957  M. MAUL  2,814,985
PUNCHED CARD CONTROLLED TYPE PRINTER
Filed Jan. 6, 1953  9 Sheets-Sheet 1

Inventor:
Michael Maul
BY
ATTY.

Dec. 3, 1957 M. MAUL 2,814,985
PUNCHED CARD CONTROLLED TYPE PRINTER
Filed Jan. 6, 1953 9 Sheets-Sheet 2

Inventor:
Michael Maul
BY *[signature]*
ATTY.

Dec. 3, 1957            M. MAUL            2,814,985

PUNCHED CARD CONTROLLED TYPE PRINTER

Filed Jan. 6, 1953            9 Sheets-Sheet 3

Inventor:
Michael Maul

Dec. 3, 1957  M. MAUL  2,814,985
PUNCHED CARD CONTROLLED TYPE PRINTER
Filed Jan. 6, 1953  9 Sheets-Sheet 5

Inventor:
Michael Maul

Dec. 3, 1957 M. MAUL 2,814,985
PUNCHED CARD CONTROLLED TYPE PRINTER
Filed Jan. 6, 1953 9 Sheets-Sheet 6

Inventor:
Michael Maul

Dec. 3, 1957 M. MAUL 2,814,985
PUNCHED CARD CONTROLLED TYPE PRINTER
Filed Jan. 6, 1953 9 Sheets-Sheet 7

Fig. 12

Inventor:
Michael Maul
By [signature] ATTY.

Dec. 3, 1957  M. MAUL  2,814,985
PUNCHED CARD CONTROLLED TYPE PRINTER
Filed Jan. 6, 1953  9 Sheets-Sheet 8

Fig. 13

Inventor:
Michael Maul
By [signature]
ATTY.

Dec. 3, 1957    M. MAUL    2,814,985
PUNCHED CARD CONTROLLED TYPE PRINTER
Filed Jan. 6, 1953    9 Sheets-Sheet 9

Inventor:
Michael Maul
BY
ATTY.

United States Patent Office 2,814,985
Patented Dec. 3, 1957

2,814,985

PUNCHED CARD CONTROLLED TYPE PRINTER

Michael Maul, Schwabach, near Nurnberg, Germany

Application January 6, 1953, Serial No. 329,843

Claims priority, application Germany January 15, 1952

8 Claims. (Cl. 101—93)

Type printers are known which are controlled by cards having index marks and permit printing of data corresponding to the index marks to be printed selectively on the controlling cards themselves or on follower cards in the same card path. Type printers controlled by punched cards are generally called perforation interpreters.

On the other hand, type printing devices are also known, particularly in tabulating machines, in which printing effected under punched card control, or control of other marks of the card, takes place on print-receiving material which is usually provided in the form of a record list.

The present invention now provides a machine which differs from the known devices in that the same printing device is selectively settable to a printing position for printing on the controlling record cards themselves or to another printing position for printing on other print-receiving material fed in a different feeding path. For example lists, account cards, envelopes etc. may be printed. The controlling index marks may, however, also be provided in any desired manner but for reasons of simplicity in the following specification reference will be made to punched cards.

By the present invention, a record card controlled machine, particularly a punched card controlled machine is obtained which combines the functions of two machines namely of a perforation interpreter and, for instance of a printing machine for printing upon record sheets. However, in accordance with the present invention only a single printing device is provided which is common to both manners of operation. This achieves above all a considerable advance in the art of addressing machines. The same may be said for all other kinds of machines with similar problems. For instance a machine operating only as punched card controlled table printer (having no accumulators) may serve, if constructed in accordance with the invention, for the purpose of perforation interpretation.

In the following specification, the application of the invention for performing addressing operations will be referred to for the purpose of explanation. It is, however, obvious that the following considerations may also be applied in a similar manner to all other fields and problems for which the machine according to the invention can be used.

Addressing by means of punched cards affords, as compared with the usual stencil plate printing, the advantage that the price of the material for the cards is negligible as compared with the price of the stencils and that the cards may be prepared by a simple punching machine provided with an alphabetic key board. Moreover, changes and supplementary entries may be taken care of immediately by punching a new card.

Addressing by means of punched cards affords moreover the great advantage that groups of addresses to be selected may be easily and quickly sorted by means of a sorting machine and that then only those cards actually used for printing have to be run through the machine. In the stencil plate system such a selection by machinery can only be effected by running all stencils through the addressing machine, only those stencils desired for printing being selected by special presettable group selectors. Therefore, even at a high feeding speed of the stencils, such machines involve much idle time in the running of the machine which reduces the economy of the machine.

The selective setting of the machine according to the invention for one of the two above-described printing functions may be obtained in different ways. In a preferred embodiment the printing positions for the record cards and for the other print receiving material are arranged adjacent to each other at right angles to the feeding directions of the cards and of the print-receiving material, and the printing mechanism is settable to one of the two printing positions by displacement at right angles to the feeding direction. In another embodiment, the printing positions for the record cards and for the other print receiving material are arranged locally displaceable with respect to each other along the setting path of the types of the printing mechanism and the printing mechanism being common to both printing positions is settable to one of the two printing positions by displacing the zero-position of the printing mechanism.

In the embodiment of the invention described hereinafter the control of the printing device is effected by cards having a plurality of hole combination decks. In this embodiment the printing device is equipped with a number of type carriers corresponding only to the number of columns of a single deck, the type carriers being adjusted for the printing of each deck. Since for addressing generally a limited number of adjacent characters is sufficient (for instance 30 characters per line) the printing device, if controlled by cards having a plurality of perforation decks, can be comparatively small, while, however, permitting the whole address to be printed in a plurality of lines.

In the addressing work the address carriers frequently carry certain additional data such as the insurance group. In addition thereto, also other information which is for instance only provided for the intra-office use is indicated and which the addressee need not know. In one embodiment, a column selector device is provided by means of which any desired perforation column can be excluded from the control of the printing device. This column selector device may of course also be used to eliminate one or more complete lines from printing. This is necessary if only the name but not the corresponding address is to be printed.

Since generally for the address three printing lines are sufficient, in the embodiment described below a punched card having three perforation decks has been assumed. However, in order to permit also printing of addresses having more than three printing lines, also two punched cards can be used for each address. The line spacing for the printing of two consecutive cards on the other print carriers may then be set under the control of a comparing device for the designation data on two consecutive cards and, depending on the agreement or disagreement of the designation, a larger or smaller line spacing is effected between the prints corresponding to the consecutive cards.

Figure 13:
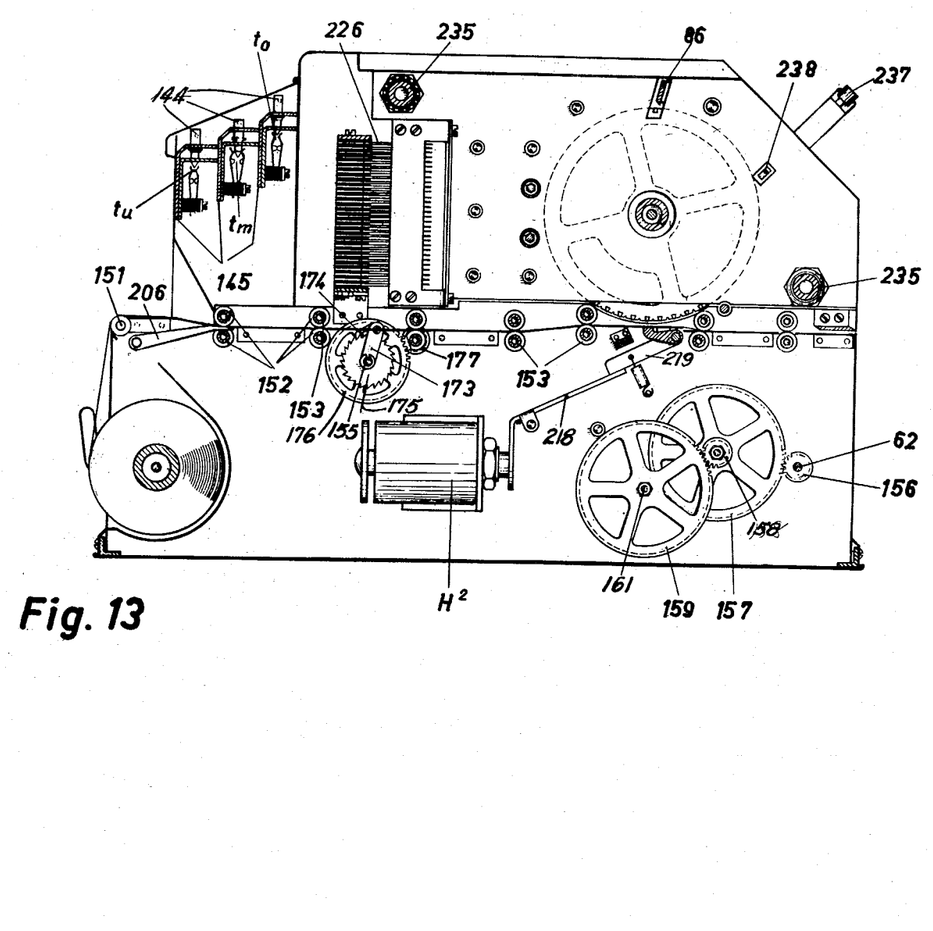
Fig. 13 is a section on the line 13—13 of Fig. 12.
Figure 14:
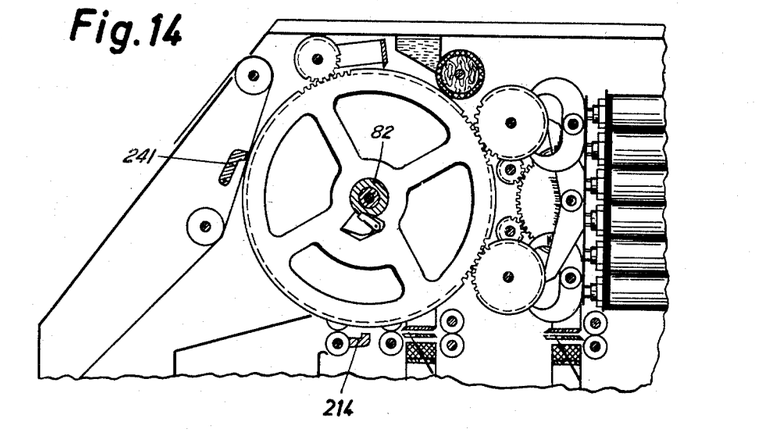
Fig. 14 is a section through a second embodiment wherein the printing of cards and of the list is effected in different zero-positions of the printing device.
Figure 15:
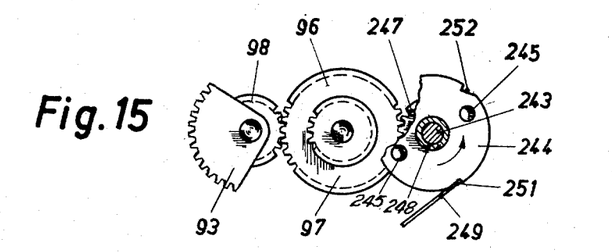
Fig. 15 is a view of the device for displacing the zero-position of the type wheels.
Figure 16:
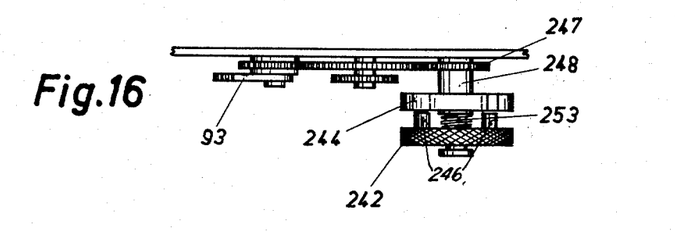
Fig. 16 is a plan view of the arrangement according to Fig. 15.

In the accompanying drawings there is at first shown in Figs. 1 to 13 an embodiment wherein a printing device consisting of a row of type wheels is selectively displaceable in axial direction into printing positions for the card and for the list, respectively. In Figs. 14 to 16 a further embodiment is illustrated wherein the selection of the printing position is effected by varying the zero-position of the type wheels.

The invention will be best understood from the following description of the drawings in which.

*General construction*

The machine is constructed in such a way that it may be used for the printing of lists and envelopes as well as for printing on the punched cards controlling the machine. For this purpose the feeding devices for the cards and for the list are arranged side by side. Above the same there is provided a printing device which may be brought over the path of the list as well as over the card path. Moreover it is also possible to set the printing device transversely of the list to any desired place of the same.

Figure 2:
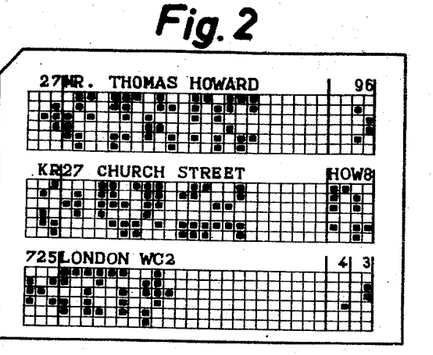
Fig. 2 is a card printed upon by the machine.

The control of the printing device is effected by three-deck perforated cards whereof one is shown in Fig. 2. Each deck has 30 columns each of which comprises 6 hole positions. The characters are represented by hole combinations. The three decks of the card are analyzed one by one and the printing device is controlled accordingly. After the analysis of each deck, printing of a line is effected. Accordingly from a single card three lines are printed which normally are sufficient for an address. If an address consists of more than three lines, two consecutive cards may be used for the same address whereby a maximum of six lines is obtained.

Figure 1A:
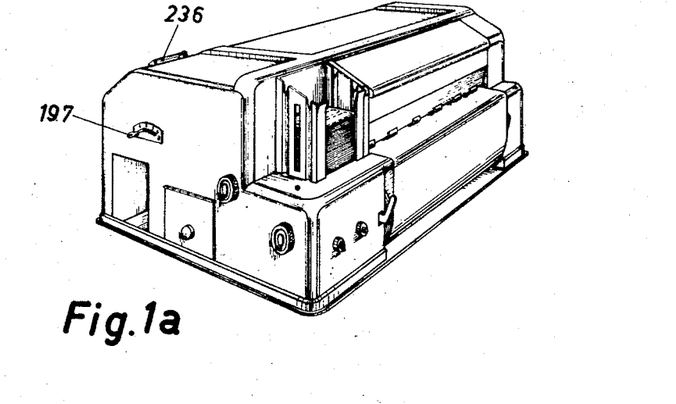
Fig. 1a is a perspective general view of the machine.

After the analysis of one or of a plurality of associated cards the machine will automatically effect a long feed which is settable to different lengths of feed and which will feed the list to the place where the next address is to be printed. Moreover, there is the posibility of varying the spacing of the lines within the address. The setting of this spacing is effected by means of the handle 197 (Fig. 1) by means of which four different line spacings may be set.

In addition to lists the machine may also print envelopes. For this purpose a device is provided which automatically stops the machine if no further envelopes are fed. The feed of the envelopes is effected manually.

In order to permit the elimination of certain columns from the transfer a column elimination device has been provided. The elimination of the various columns is obtained by interrupting the controlling current circuit of the column to be eliminated by means of a key. For each deck a particular set of keys is provided. The same is included in the controlling current circuit depending on which deck is under the analyzing device.

*Printing mechanism*

Figure 3:
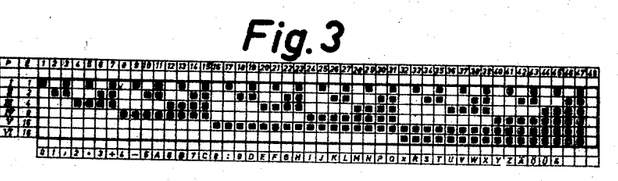
Fig. 3 is the code according to which the cards are perforated.

The control of the printing mechanism is effected according to the code illustrated in Fig. 3. The interpretation of a character is determined by its position within the row of characters, each position having a certain value associated therewith. This value results from the addition of the partial values associated with the various hole positions. The values arising from the various partial values are selected in a way which allows a certain value to be indicated only by a single hole combination. For numerals, alphabet and other characters there are about 45 hole combinations necessary. In order to obtain a certain margin the code was chosen with 47 characters plus a vacant field thus permitting in Fig. 3 the insertion of two further characters, if desired.

The characters can be associated arbitrarily with the various hole combinations, but the position of a character within the row of characters is determined by the numerical interpretation of the hole combination. Accordingly, in arranging the type on a type wheel the latter must be divided into 48 equal sections. A particular character is associated with each section.

The printing device consists of a row of adjacent type wheels. There is a common drive provided for all type wheels to which the type wheels may be clutched. Clutching takes place as soon as a hole has been detected in the analyzed position. Unclutching is effected automatically as soon as the type wheel has been adjusted to the corresponding value and the card is moved to the next hole position. Printing will only take place if all six positions of a column have been analyzed. Accordingly, clutching can be effected for each position and unclutching will automatically take place past each position wherever clutching has been effected. In this way it is possible that the type wheel may be adjusted several times before printing takes place.

The drive is provided in such manner that its displacement is varied from position to position except between the two lowermost positions. If several holes are provided in a column the displacement determined by their values will be added one by one. If it is assumed for instance that the third and fifth position of a column are punched the type wheel will be moved upon the analysis of the position III through 4 units and upon analysis of the position V through 16 units. Upon analysis of the positions I, II, IV, VI no movement takes place since there was no hole provided in the same and consequently a clutching operation has not occurred. Accordingly, the type wheel had been moved for 20 units which according to the code corresponds to the character E.

The machine is provided with 30 printing positions, each of the latter is associated with a card column and can be disconnected selectively from the analyzing device by means of keys, separately arranged for upper, middle and lower deck. The circuit diagram will be described more in detail later on. The drive for the printing device is effected by a crank drive. The crank drive was chosen because it permits a quiet and safe clutching and unclutching at its dead centre positions. Further the return movement which necessarily occurs in a crank drive can be used for unclutching. The operation of the crank drive is diagrammatically illustrated in the operating diagram in Fig. 4.

The crank 11 is continuously driven with constant speed in counterclockwise direction. During each turn of the crank the card is advanced for one position. Upon each full revolution of the crank 11 the crank 12 is displaced one step in counterclockwise direction. A rod 14 is pivoted to the crank 11, said rod being mounted for reciprocating movement in the guide 15. (This guide is only symbolically indicated in Fig. 4 while actually it is constructed differently therefrom.) The right hand end of rod 14 describes an ellipse-like curve. If the guide 15 is moved the curve will change. At the left hand end of the rod 14 there is a rocker 13 connected thereto by the link 16 which latter rocks in accordance with the curve. The angle through which the rocker 13 swings is dependent upon the shape of the curve. The guide 15 is now moved in such a way as to cause the various angles of swing of the rocker 13 to be proportioned to each other in the same manner as the values according to Fig. 3. In all five positions (the sixth position is identical with the fifth position) a constant angle must be subtracted in which the rocker runs idle on account of the play between the gears, and other parts. This play is also necessary for another reason and as will be shown later, it is intentionally increased so that the drive can remain stationary at the moment of clutching.

The position and dimensions of the crank drive have been chosen in such a manner that in the one dead centre of the rocker 13 the guide 15 as well as the auxiliary crank drive co-operating therewith (described later) may be adjusted without changing the position of the rocker 13. This is necessary since the clutch for the clutching of the registering places to their drive must be always in the same position independently of the position in which the guide 15 happens to be. It is only necessary to take care that the guide 15 has already reached the positions (indicated in Fig. 4 by Roman numerals in accordance with the hole position designation) associated with the analyzing positions of the hole positions at the second dead centre of the rocker 13 (indicated in dash lines in Fig. 4) since the position of this point determines the amount by which the type wheel will be advanced.

Figure 4:
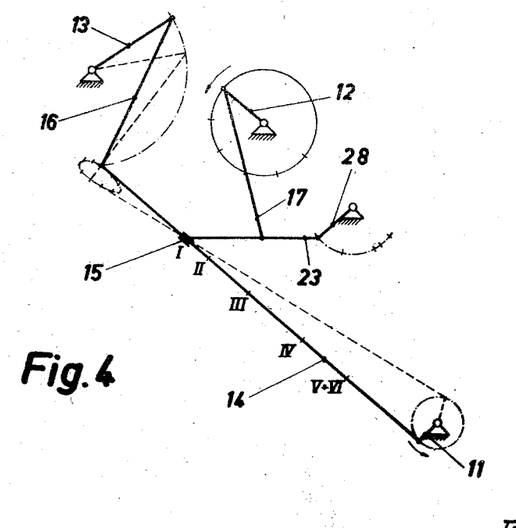
Fig. 4 is a diagram of the crank drive.

The adjustment of the guide 15 is effected by the crank 12. The latter makes one revolution for each card run. Dimensions and position have been chosen here in such manner that the unequal distances between consecutive positions of the guide 15 on the rod 14 are transformed into equal movements of the crank 12. This is an advantage in so far as in addition to the step by step shifting also a continuous drive of the crank 12 can be derived from crank 11, if desired.

As may be seen from Fig. 3 the same value 16 has been provided for the positions V and VI. The position of the crank drive for these two positions must result, as has been indicated above, in twice the same displacement though the crank 12 is turned for one step. This is obtained by reason of the fact that in the VI-position the link 17 gives the same position for the guide 15 as in the V-position.

*Construction of the crank drive*

Figures 5, 6:
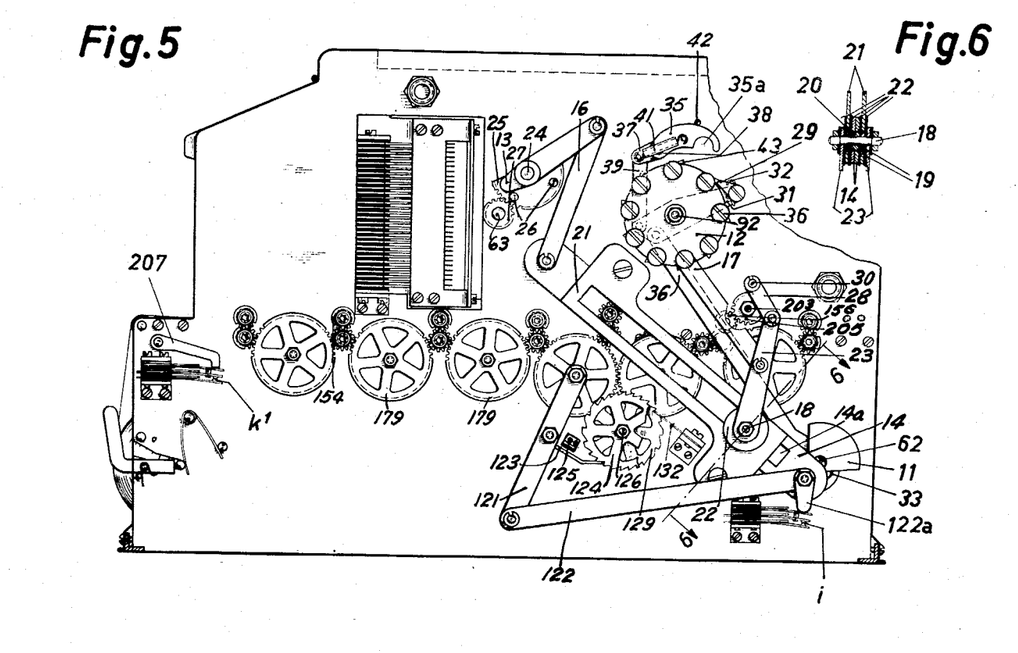
Fig. 5 is the rear view of the machine with the cover removed.
Fig. 6 is a section through the crank drive on the section line 6—6 of Fig. 5.

The actual construction of the crank drive is shown in Figs. 5 and 6. The rod 14 consisting of two adjacent metal sheets is linked to the crank 11. It has a rectangular cut out portion 14a in which can slide a guide piece 20 (Fig. 6). The guide piece 20 is loosely seated and rotatable upon the pivot pin 18. On the pin 18 there are further mounted the two loose guide pieces 19 adapted to slide in the guide bars 21 which are provided on both sides of rod 14 and are fast to the base plate. As a protection against mutual interference of rod 14 and the guide bars 21 and, in order to prevent the guide pieces from sliding off, disks 22 are provided between the guide pieces 20 and 19. The arrangement of the guide pieces permits sliding of the pin 18 in the guide bars 21, sliding of the rod 14 on the pin 18 and rocking of the rod 14 relative to the fixed guide bars 21 about the axis 18. The displacement of the guide pieces is effected by the two links 23 which are screwed fast to the pin 18. At the left hand end of the rod 14 the rocker 13 is connected by the link 16. The rocker 13 is rotatably mounted on the stud 24 which is fast to the base plate and upon which also the toothed segment 25 can turn. The rocker 13 can take the toothed segment 25 with it by engaging the two stops 26. The position of the stops has been chosen in such manner that upon the change of direction the rocker 13 moves idly through a certain angle with respect to segment 25. This idle movement is necessary in order that when clutching of the registering mechanism takes place (as before mentioned) at the one dead centre, the drive is stationary. The toothed segment 25 meshes with the pinion 27 from which the drive for the printing mechanism is derived.

The positioning of links 23 and therewith of guide 15 is effected through link 17 by crank 11 which in practice takes the form of a ratchet wheel. The rocker 28 connected to the links 23 is rotatably mounted at its right hand end on the stud 30 which is fast in the casing. The rocker 28 is necessary in order to safeguard the proper positioning of the link 23 and thereby also of the guide.

Movement of the ratchet wheel 12 is effected by pawl 29. The pawl 29 is rotatably mounted on the rocker 31 and is resiliently held against the ratchet wheel 12. The rocker 31 is driven by an eccentric 33 and the eccentric rod 34. The eccentric 33 is mounted upon the same shaft as the crank 11 so that the rocker 31 will rock back and forth once at each revolution of the crank 11. By this means the ratchet wheel 12 will be moved one step by means of pawl 29. By this movement the movement of the guide 15 is effected through rod 17 and the link 23, the rod being pivotally mounted on the ratchet wheel 12.

The position of the guiding pieces in the guide bars 21 must be exactly defined after the rocker 13 has reached the outer dead centre. This is necessary since at this moment declutching of the type wheel takes place. As indicated above, this dead centre position also indicates the value for the associated position. During the remaining time the guide may be moved, this movement having however no influence upon the adjustment. The position of the guide has no influence upon clutching since the crank drive and the position of the guide bars 21 have been chosen in such manner that the position of the one dead centre is independent of the positioning of the guide.

Provision must be made that forces occurring and tending to move the guide from the predetermined position which must in no event occur at the outer dead centre, cannot have any influence. Therefore the ratchet wheel 12 is arrested at this moment and is blocked in both directions of rotation so that no unforeseen movements can arise. Blocking is effected by the lever 35 with its semicircular cut out portion 35a. The cut out portion 35a of lever 35 can engage over the screw heads 36 thus blocking the rotation of the ratchet wheel 12 in both directions. This blocking must be maintained for some time. Moreover, a quick engagement is desired which is obtained by a snap-action mechanism. The arm 37 is rotatably mounted upon the stud 38 fast to the casing and is connected through link 39 to the rocker arm 31. Therefore the arm 37 will rock synchronously with the rocker arm 31. Upon the stud 38 there is also rotatably mounted the lever 35 which is connected by spring 41 to the arm 37. Under the influence of the rocking movement of arm 37 the lever 35 will now continuously snap back and forth between the stop 42 and the screws 36. The dead centre has been positioned in such manner that the lever 35 engages the screw 36 when the guide or the screws 36 respectively have reached the proper position.

In order to compensate for tolerances and play and to permit an exact adjustment of the strokes the various screws 36 or the teeth 43 of the ratchet wheel are individually adjustable. The ratchet wheel 12 is constructed as a simple disk to which each of the teeth 43 is fastened by means of a screw 36. The screw holes in the disk are somewhat larger thereby providing a limited adjustability. In order to compensate for difference in the division which possibly might occur by the assembling, a larger stroke has been provided for the pawl 29 than for the normal division.

The six screws 36 and teeth 43 respectively that are necessary for the various positions of the guide 15 are spaced a smaller distance from each other than the remaining three. These three screws are required in order to restore the crank drive, for positioning the guide, to its home position again. During this time also printing and deck change will take place. The distance between these three screws has been somewhat increased in order that in the interval between two cards which corresponds to four normal shifting steps, only three steps may occur.

*Clutch system for type wheels*

Figures 8, 9:
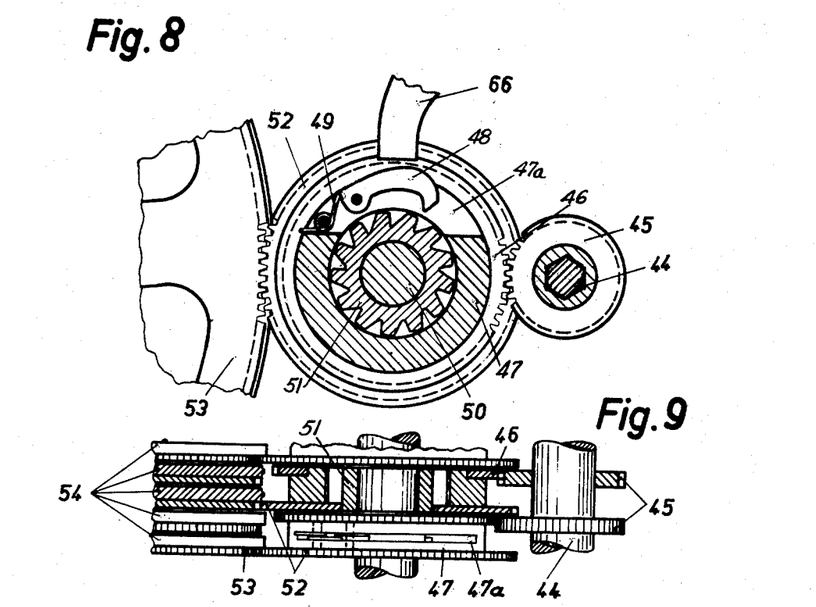
Fig. 8 is the clutch mechanism for the type wheel in section at right angles to the shaft.
Fig. 9 is the clutch mechanism for the type wheel partly in section and in plan.

The back and forth movement of the pinion 27 (Fig. 5) is transferred through a gear mechanism, which will be referred to later, to the shafts 44 (Figs. 8 and 9). The shaft 44 is in the form of a hexagon on which a sleeve is axially movable. The sleeve carries the pinions 45. The arrangement of the wheels in Figs. 8 and 9 does not exactly correspond to the position in the machine. This arrangement has been chosen in order to permit a clearer view of the section in Fig. 9. For each type wheel a pinion 45 is provided. The latter meshes with the pinion 46 which is firmly pressed upon the ring 47. In the ring 47 there is provided a slot 47a accommodating the pawl 48 and the spring 49. By spring 49 the pawl 48 may always be held in one of two rest positions. The ring 47 only rotates upon the teeth of actuating wheel 51. To the actuating wheel 51 the pinion 52 is rigidly fixed the latter engaging the pinion 53. The actuating wheel 51 is rotatably mounted upon the shaft 50 and the gear 53 is rigidly connected to the type wheel 54.

According to the value of the effective hole position each ring 47, driven by its pinion 45 will be rotated. If the clutch magnet has been energized slightly earlier by a hole in the card, the lever 66 will encounter the pawl 48, which will be pressed into a gap between the teeth of the actuating wheel 51, said pawl taking the wheel 51 with it in counterclockwise direction. Through pinions 52 and 53 the type wheel is thereby moved accordingly. Engagement of the pawl can only occur in a predetermined position which is referred to later on the circuit diagram. The initial position of the pawl is determined by the crank drive as has already been mentioned. The movement of the actuating wheel 51 always takes place for a multiple of the pitch so that the teeth will always be again in the proper position for engagement.

Figure 7:
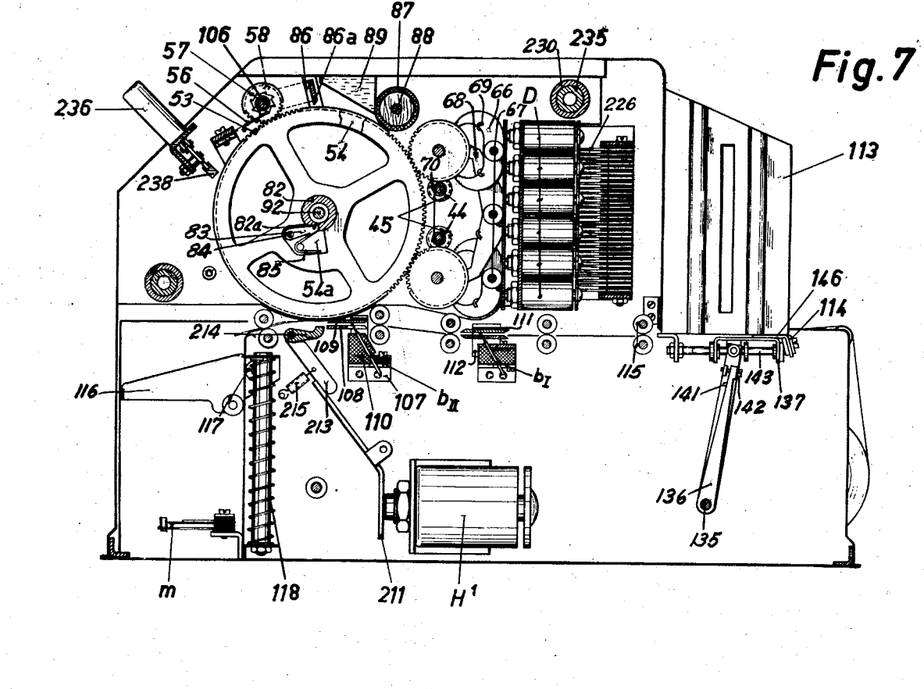
Fig. 7 is a section through the machine on the section line 7—7 of Fig. 12.

Upon backward movement of ring 47 the type wheel 54 and therewith gear 53 are locked against backward movement by spring 56 (Fig. 7). The spring 56 engages with a locking wheel 57 which is fast to the gear 58, the latter meshing again with gear 53. Accordingly, also gear 51 is blocked against rotation in clockwise direction (Fig. 8). The pawl 48 is forced outward by the inclined back face of the tooth until it reaches its outer position in which it will then be held by the spring 49. Accordingly, declutching will automatically take place right at the beginning of the backward movement. The ring 47 will now run back until the dead point for the next clutching operation is reached.

Figure 12:
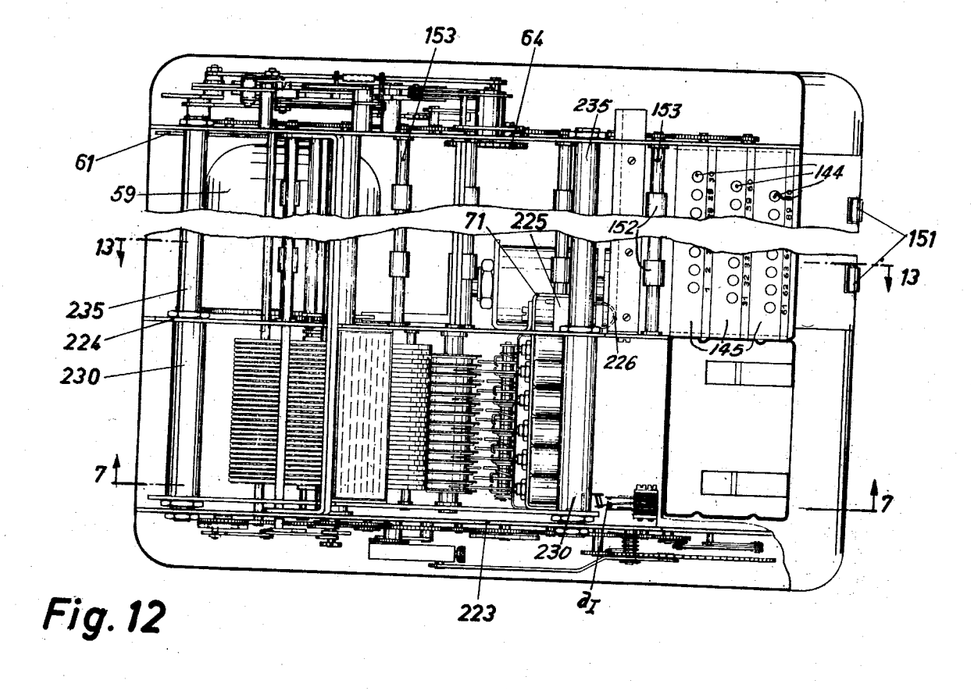
Fig. 12 is a plan of the machine with the cover removed.

The crank drive is arranged at the rear wall of the machine in such manner that it is easily accessible from the rear (Fig. 5). The drive for the crank drive is effected by motor 59 (Fig. 12) through the gear 61. On the shaft 62, on which the gear 61 is mounted, the crank 11 is also mounted. Accordingly, the crank drive runs continuously as long as the machine is in operation. The drive is effected through the described crank drive from pinion 27 through shaft 63 (Fig. 5) to the gear 64 (Fig. 12). The gear 64 drives the two shafts 44 (Fig. 7) upon which are provided the sleeves 70 with the driving wheels for the clutches to the type wheels which are generally indicated at 45 for all printing places. The shafts 44 are of hexagonal form and are mounted in the two side walls of the machine.

The magnets D are provided on the stirrup 71 (Fig. 12) which is fastened to the transverse walls 223 and 224 of the printing device. In addition an insulating body 225 carrying the contact springs 226 (Fig. 12) is provided on the stirrup 71. For each magnet D two springs 226 are provided. Accordingly 60 contact springs are mounted on the insulating body 225. The contact springs 226 can slide on the bars 227, one of the latter being provided for each spring. The bars are insulated from one another. The magnets D receive current through the contact springs. The contact springs permit a convenient displacement of the printing device. The contact bars 227 are comprised in a block and are fastened to the rear wall as well as to the intermediate wall of the machine.

The arrangement of the clutch magnets requires a staggering in six groups (Fig. 7). The magnets are so arranged that always three groups of magnets operate upon one group of the two groups of clutches. From Fig. 8 it may be seen that the position of pawl 48 or of ring 47 is of no importance for the position of clutch engagement. It is only imperative that during engagement the point of the pawl is always over any one of the tooth gaps of the actuating wheel 51. Accordingly, the position of the pawl is only a question of assembling and of the arrangement of the clutch levers. The clutch levers are rotatably mounted upon the three spindles 67 (Fig. 7) and are alternately directed upwardly and downwardly on each spindle. Each of the levers 66 of both outer spindles 67 acts upon the same group of clutches while the levers 68 of the middle spindle 67 act alternately upon one of both groups of clutches. The clutch levers are held in their home position by springs 69. A clutch magnet D may act upon each clutch lever.

Figure 10:
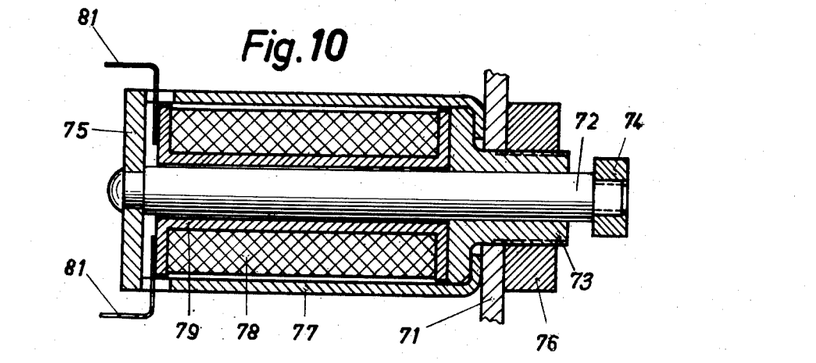
Fig. 10 is the clutch magnet.

The magnets in the form of solenoids are herein fastened to the stirrup 71 (Fig. 10). More in detail the magnet consists of a core 72 slidable in the sleeve 73. Its movement is limited by the nut 74 and the disk 75. The latter is riveted to the core 72. During assembly the sleeve 73 is drawn by the nut 76 against the stirrup 71. The cover 77 is rigidly held between stirrup 71 and sleeve 73 by nut 76. The cover 77 is necessary in order to establish the magnetic circuit. Within the cover 77 there is provided the winding 78 upon the spool 79. In the cover 77 there are provided two slots permitting the soldering terminals 81 to pass through. The nut 74 presses upon the lever 66 or 68 respectively (Fig. 7) and in its rest position is pressed by spring 69 through lever 66 against the sleeve 73. If the magnet is energized (position shown in Fig. 10) the plate 75 is drawn towards the cover 77. The nut 74 presses upon the clutch lever which in turn presses the pawl 48 into the tooth gap of the actuating wheel 51.

The type wheels 54 (Fig. 7) are rotatably mounted upon the sleeve 82. In each type wheel there is provided a recess 54a in which engages the pawl 83. The pawl is rotatably mounted upon the stud 84 which is fast on gear 53 being connected to the type wheel 54. The pawl 83 is pressed by spring 85 against the sleeve 82. The sleeve 82 is provided with a groove 82a. Upon actuation of the type wheel the latter will rotate in clockwise direction whereupon the pawl 83 slides over sleeve 82. While the type wheels are being set the sleeve 82 is stationary. After printing the sleeve 82 will rotate in clockwise direction. Depending on the position of the type wheels the pawls 83 are engaged by the groove 82a and will be moved by the latter whereby the type wheels are restored to their home position. The drive for the sleeve 82 will be referred to later on.

Shortly before printing, the yoke 86 (Fig. 7) is pressed against the type wheels. In the type wheels grooves are provided in which the point 86a of the yoke 86 will engage and will adjust the type wheels.

Inking of the type wheels is effected by the disks 87 on the axis 88. The disks 87 draw the ink from the container 89.

The cycles of adjustment of the type wheels and zeroizing take place in the same operation so that their movements may be derived from the same drive. The drive for the same is effected from ratchet wheel 12 (Fig. 5) which makes one revolution per deck or printing cycle, accordingly three revolutions per card passage. The ratchet wheel is fast on the shaft 92, which is mounted on the sleeve 82 (Fig. 7). At the other end of the shaft 92 (Fig. 11) there are fastened the toothed segment 93 and the two cams 94 and 95. The gear 98 is driven by a toothed segment 93 through a reduction gear with the gears 96 and 97. Gear 98 is fastened on the sleeve 82 serving for zeroizing. The ratio of the gears as well as the dimensions and the position of the toothed segment have been chosen in such way that zeroizing is effected in the last quarter of the printing cycle, shortly after the printing proper.

The cam 94 causes the adjustment of the type wheels. Upon its movement the cam 94 rocks the lever 105 which is fast on the shaft 106 in clockwise direction. The yoke 86 which is seated on the shaft 106 is pressed downward thus adjusting the type wheels. Furthermore the detent wheels 57 (Fig. 7) for the type wheels are rotatably mounted on the shaft 106.

When the setting of the printing device is completed the cam contact $n^2$ (Fig. 11) closes, establishing the circuit through one of the magnets H so that the latter is energized and rocks the lever 211 in a clockwise direction (Fig. 7). The latter engages the arm 213 of the printing hammer 214 and rocks the latter in counter-clockwise direction. Thereupon during perforation interpretation the hammer 214 presses the card against the type wheels thereby causing printing. Through spring 215 the printing hammer, the lever 211 and the magnet $H^1$ are again restored to home position as soon as the circuit is interrupted and the magnet becomes deenergized.

The drive for the hammer 221 (Fig. 13) for list printing is effected by the magnet $H^2$ by means of the levers 218, 219 in a similar manner as for card printing and will not be further described here. If the armature $A^2$ is energized it will move its core to the right and rock the double arm lever 218 about its pivot. The left hand arm of lever 218 engages the core and the right hand arm engages the lever 219. Lever 219 will therefore be rocked in clockwise direction. Since lever 219 and hammer 221 are fastened on a common shaft hammer 221 will be impelled against the record sheet. The control through which one of the two magnets H is energized is effected by the contact $a_I$ (Fig. 12) which is actuated by the printing mechanism when the latter is set for card printing. In this instance the current is fed through the magnet $H^1$. If the printing device is moved from this position to another position for list printing the contact $a_I$ will shift, whereby the current is fed through the magnet $H^2$ which actuates the hammer for list printing.

The cam contact $n^2$ is controlled by the cam 100 (Fig. 11) being also provided on the shaft 92 which rotates once per printing cycle. The shape and the position of the cam have been so chosen that the current impulse is caused at that moment when aligning of the type wheels is finished, however before zeroizing has begun. The cam disk 95 actuates the contact $n^1$ the purpose of which will be described later in connection with the circuit diagram.

The perforations in the card are analyzed by the brushes $b_I$ and $b_{II}$ (Fig. 7). The card is fed past the same step by step. The position of the brushes relatively to the printing device must be defined exactly in such a way that the card will reach the printing position, when the last hole position has passed the brushes $b_{II}$. At this moment also the setting of the type wheels is completed. The brushes are maintained in the sets of brushes 110 (Fig. 7) which are fastened on the front wall and intermediate wall of the machine by means of the stirrup 107. In addition the brushes are also guided in the combs 108 and are supplied with current by the contact plates 109. The latter are fastened on the front wall and the intermediate wall of the machine by means of the insulating bars 111 and the stirrup 112.

For comparing the group numbers the brushes $b_I$ are provided which analyze the very same position of a card when $b_{II}$ analyzes the preceding card. In order to enable a reduced number of brushes to be employed for the group control brushes $b_I$ the group number has been arranged in predetermined columns of the middle deck of the card.

Accordingly only so many brushes must be provided as there are places in the largest group number. Fastening of the brushes $b_I$ is effected in a similar manner as that of the brushes $b_{II}$.

*Card feed*

The cards are inserted in the magazine 113 (Fig. 7) and are fed by the card knives 114 past the rollers 115. The latter feed the cards past the group control device, the analyzing device and the printing mechanism to the card receiver. There the cards drop on the card support 116 which is guided by rollers 117 and urged upwardly by the spring 118. The contact $m$ is opened by the card support 116 in its lower position by means of which the whole machine is stopped, if the card receiver is filled.

The drive of the feed rollers is effected step by step by the crank 11 (Fig. 5), to which the rocker 121 is connected by link 122. The pawl 123 is mounted on the rocker 121 and is resiliently urged against the ratchet wheel 124 (Fig. 5). Consequently the ratchet wheel 124 is displaced by one step by one revolution of the crank 11, the drive of the feed rollers being effected by said wheel.

The link 122 is provided with a projection 122a, which actuates the contact $i$. By this means the contact $i$ is closed once at each revolution of the crank 11. The contact is closed at the moment at which the crank drive has reached a dead centre position for clutching of the type wheels. The contact $i$ controls the current impulses through the clutch magnets D of the printing mechanism. Accordingly they can only respond if the crank drive is in the dead centre position for clutching and if the pawls 48 are exactly over a gap of the toothed wheel 51 (Fig. 8).

The ratchet wheel has been so arranged that one revolution of the same corresponds to one card cycle of the machine or to 27 revolutions of the crank 11 respectively. The 27 revolutions of the crank 11 per card cycle follow from the analysis of the three decks each analyzing cycle of a deck requiring 9 revolutions as has already been described above. Since during card change the card must run faster than during the analysis the distribution around the circumference of the ratchet wheel is not equal. This is due to the fact that upon card change the larger deck distance must be covered by the same steps as are used for the smaller deck distance within a card. This is conditioned by the particular nature of the crank drive as has already been described above, since the card change must be effected during the three steps in which the crank drive is brought to its home position. The stroke of the pawl has been so dimensioned that the largest step or the largest pitch respectively can still be fed by the pawl. An exact adjustment of the engagement of the pawl is effected by the stop 125. The ratchet wheel 124 is fast upon the shaft 126.

Figure 11:
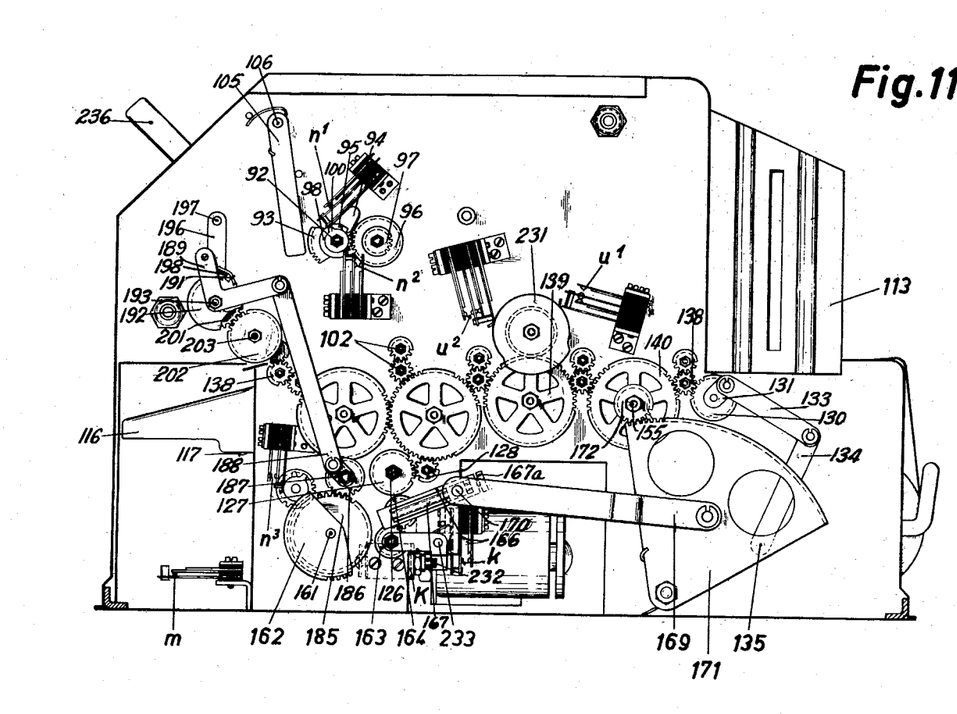
Fig. 11 is the front view of the machine with the cover removed.

On the front wall (Fig. 11) there is the toothed wheel 127 fast upon the shaft 126 said wheel driving through the intermediate gears 128 and 139 the gears 138. The latter are fast upon the shafts 102 upon which are also provided the feed rollers 115. The remaining rollers 115 for the card feed are driven by the gears 138 and 139 (Fig. 11). The ratio of the rollers has been so chosen that one revolution of the ratchet wheel 124 corresponds to the feed of a card for one card division. The spring 132 (Fig. 5) engages in the detent wheel 129 on the shaft 126 and locks the ratchet wheel against backward movement. Moreover the various steps for the card feed are hereby exactly determined.

The drive for the card knives is effected through crank 131 (Fig. 11) which is fast to the gear 130. The latter meshes with one of the gears 138 serving for the drive of the feed rollers. To the crank 131 there is linked the rocker 134 by means of the link 133, said rocker being fast upon the shaft 135 (Fig. 11). On the shaft 135 there is also fast the lever 136 (Fig. 7). The lever 141 however is freely mounted on the shaft 135 and is connected to the lever 136 by means of the setting screw 142. The lever 141 engages the arm of the slide 137 and reciprocates the same upon the round guides 143 which are provided below the supply magazine. Upon the slide 137 the knife carrier 146 is fastened to the card knives 114.

Sheet feed

As has already been mentioned above a long and a short feed are provided for the sheet. The short feed takes place between the various lines of an address, the long feed however between the various addresses. The short feed which may also be called line spacing will be described later on in detail.

The long feed is derived from the shaft 62 (Fig. 5) on which is fast the crank 11 of the crank drive as has been described above. The shaft 161 is driven by the shaft 62 by means of the gears 156, 157, 158 and 159 (Fig. 13) including altogether a ratio 27:1. Accordingly the shaft 161 rotates once per card cycle. On the shaft 161 there is the toothed segment 162 (Fig. 11) which drives the gear 164 through the idle gear 163.

The position and shape of the toothed segment 162 has been so chosen that the latter will engage the gear 163 as soon as the last line has been printed and that half of the toothed segment has run down before the printing of the first line of the next card. The ratio between the toothed segment 162 and 164 has been selected in such manner that one rotation of the toothed segment results in one rotation of the gear 164. The gear 164 is fast to the crank 166 to which the toothed segment 171 is pivoted through the link 169. The toothed segment 171 therefore rocks at one revolution of the toothed segment 162 and will thus reciprocate once per card cycle.

The rocking angle of the toothed segment 171 may be varied on the crank 166. For this purpose there is a sliding member 170 provided in the crank 166 said member being adjustable by means of a worm shaft 167 with respect to the pivot of the crank said shaft having a knurled head 167a. On the sliding member 170 there is a pivot centre for the link 169. Accordingly by means of the worm shaft the operating radius of the crank 166 may be varied and therewith the rocking angle of the toothed segment 171. The sliding member 170 may be moved so far that the operating radius of the crank or the rocking angle respectively will become zero.

The drive for the long feed is effected from the toothed segment 171. Depending upon the extent of the rocking angle the extent of the long feed will result which may be set by the knurled head 167a. The toothed segment 171 meshes with gear 172 on the shaft 155 upon which is also fast the arm 173 (Fig. 13). On the latter is mounted the pawl 174 which is resiliently pressed against the ratchet wheel 175. The ratchet wheel is freely rotatable upon the shaft 155 and is fast to the gear 176. The latter is also freely rotatable on the shaft 155. If now the toothed segment 171 rocks to the right (Fig. 11) the gear 172 and therewith the shaft 155 thus rocking shaft 155 and arm 173 (Fig. 13) in counterclockwise direction. During this operation the pawl 174 takes with it the ratchet wheel 175. The gear 176 transfers the rotary movement to the gear 177 upon the sleeve 153 from which are driven, through gears 154 (Fig. 5) and idle gears 179, the feed rollers 152 in the feeding path for the sheet. If the toothed segment 171 moves to the left (Fig. 11) the arm 173 rotates in clockwise direction (Fig. 13), the pawl 174 slipping over the ratchet wheel 175. The ratchet wheel 175 cannot move backward since the sheet feed is locked against backward movement by a further pawl 191 (Fig. 11) which will be referred to below.

If an address consisting of more than three lines is to be printed, two cards must be used for this purpose as already mentioned above. The long feed must not become effective between these two cards. The control is effected in the instance by the group control brushes which detect the same group number in both cards whereby through the group control relays, as will be described below, the clutch magnet K is energized (Fig. 11) which will rock the bell crank lever 232 about its pivot 233 in counterclockwise direction. On the left hand end of the bell crank lever 232 there is mounted the idle gear 163 which is now moved downward and will be disengaged from the gear 164. The disengaging rocking takes place during the time when the toothed segment 162 is disengaged from the gear 163. Through the outward rocking of the idler gear 163 the long feed for the sheet is disconnected so that only the ordinary sheet feed is effected between two cards just the same as the short feed between two printing lines. The short feed is effected as follows:

On the shaft 161 (Fig. 11) rotating once per card cycle there is also mounted the gear 185 meshing with the gear 186. The ratio between the two gears is 1:3. The gear 186 is fast to the crank 187 from which the drive for the short feed or line spacing is effected. The bell crank lever 189 is linked to the crank 187 by means of the link 188, said bell crank lever being mounted on the stud 193. On the bell crank lever 189 there is provided the pawl 191 which is resiliently urged against the ratchet wheel 192. Moreover on the stud 193 there is mounted the arm 196 on which the handle 197 for the setting of the line spaces (Figs. 1 and 11) is provided. On the arm 196 there is provided a sheet metal guide 198 which extends below the pawl 191. On movement of the pawl to the left (Fig. 11) the same will encounter the sheet metal guide 198 and will be withdrawn through the latter from the teeth of the ratchet wheel. Depending on the position of the arm 196 the pawl may engage sooner or later the teeth of the ratchet wheel and may therefore rotate the ratchet wheel for a smaller or larger angle thus for a smaller or larger line spacing.

The ratchet wheel 192 is also mounted on the stud 193 and is fast to the gear 201. The latter meshes with the gear 202 on the shaft 203. Moreover on the shaft 203 there is provided the gear 205 (Fig. 5) meshing with one of the gears 154 for the feed rollers of the sheet feed. The transfer of the movement to the remaining feed rollers is effected by gears 154 and idle gears 179 as already mentioned above.

The two ratchet wheels 175 and 192 (Figs. 11 and 13) are therefore necessarily connected to each other through gears, the drive for the feed rollers being derived in the one instance from the ratchet wheel 175 and in the other instance from the ratchet wheel 192. The ratchet wheel not being operated then always serves as detent wheel, the pawl 191 or 174 respectively preventing a backward movement.

If instead of the record sheet envelopes are to be printed upon, a controlling device must be provided which stops the machine when no more envelopes are fed. In the present machine insertion of the envelopes is effected manually. The control of the supply is effected by the card lever 206 (Fig. 13) being depressed by the record sheet or the envelopes respectively and closing the contact $k^1$ through an arm 207 (Fig. 5). If now the supply of envelopes fails the card lever 206 returns to its home position whereupon the contact $k^1$ opens thus interrupting the whole current circuit through the machine so that the latter will stop. It is only if a new envelope is fed and thereby the card lever 206 is depressed that the machine will again start running. The shape of the card lever has been so determined that always a constant distance will be obtained between the various envelopes. Thereby it is obtained that the machine operates in the same manner as in printing of record sheets.

Displacement of the printing mechanism

As has been emphasized in the introduction, according to the invention the printing mechanism may be selectively set to punched card printing or sheet printing. In the embodiment described heretofore this is obtained by the displacement of the printing mechanism in axial direction so that the same will either be above the punched card or above the record sheet. In order to effect the displacement in a simple manner the adjacent type wheels are comprised in a unit with their clutching devices. This unit is held together by the sleeves 230 (Fig. 12) and can slide over the two guide sleeves 235. The latter are screwed to the two side walls of the machine. By means of the handle 236 and the toothed bar 238 the printing device can be latched in different positions. The latching may be released by means of the push button 237.

If the printing device is positioned as a perforation interpreter it actuates the contacts $a_I$ and $a_{II}$ arranged side by side and of which only contact $a_I$ is therefore visible in Fig. 12. The contact $a_I$ then disconnects the printing hammer for record sheet printing and includes that one for the interpreter. The contact $a_{II}$ arranged below the contact $a_I$ bridges the card lever contact controlling the card sheet path since in the case of perforation interpretation there is no list in the sheet path, the machine however being nevertheless intended to operate.

If the printing device is displaced from this position the machine will be shifted for record sheet printing. This is also the case if there is still a part of the printing device over the card feeding path. This is however of no disadvantage since the printing hammer no longer operates under the card feeding path and therefore no more printing on the card can take place. For the record sheet however only that part of the printing mechanism can now be used which lies above the record path. If the operation of the printing mechanism in the intermediate position is to be avoided which would become necessary if a common printing hammer is used for the card feeding and the record sheet feeding path, the operation of the printing mechanism in the intermediate position can be locked by means of a contact similar to the contacts $a$.

Column elimination device

As has already been described above, it must be possible to exclude individual columns of the card from the transfer upon the printing device. Therefore the current circuit extends from the brushes to the printing magnets through the contacts $to$, $tm$ and $tu$ (Fig. 13) of the column selector keys. One of such keys and an associated contact is provided for each column of a deck. The contact $to$ thus interrupts the current circuit during the analysis of the upper deck and the contact $tu$ upon analysis of the lower deck. If one of the keys 144 is depressed it will open the contact which is disposed below, thus interrupting the current circuits of the respective column of the deck concerned. The contacts are arranged in three rows along the bars 145. The contacts for one deck are always compised in one row.

Circuit diagram

Figure 1B:
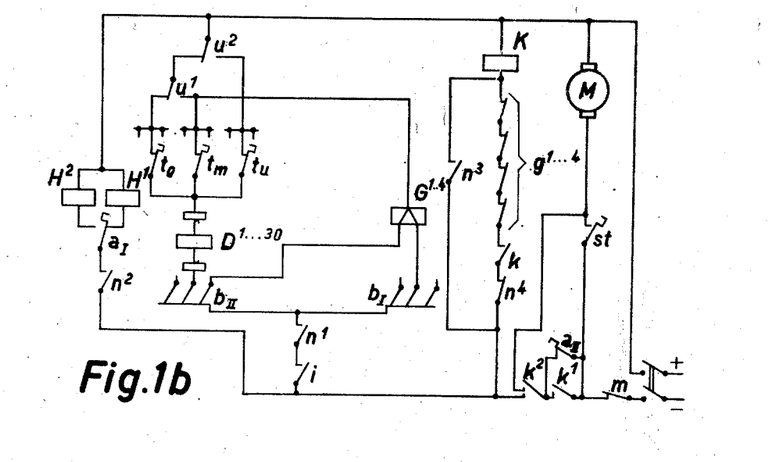
Fig. 1b is the wiring diagram of the same.

In the illustration of the circuit diagram for the machine a simplified method has been chosen, as is generally used in the art of communication. If several identical units are provided, such as clutch magnets and brushes, only one of them is shown in the diagram while the remainder are indicated by the distribution connections only. The number of the units is indicated by the Arabic index number. The relays and magnets are indicated by capitals and the contacts by small letters. Manually actuated contacts are characterized by a key-like hook on the upper end of the movable contact member. Generally, the convention is such that the characters are situated to the right of the associated magnets and contacts or above the wiring symbol respectively. The contacts are shown in the positions which they occupy when the machine is at rest.

In the first place it will be assumed that the printing mechanism is set for the printing of cards as it is also illustrated in the drawings. If the machine is switched on it will not start running at once. It is only if the start key $st$ (Fig. 14) is depressed that the current can flow from negative through the contacts $m$ and $st$ through the motor M to positive. The machine will start running and will feed the cards to the analyzing device. As soon as the first position of the first card has reached the analyzing brush $b_{II}$ the card will actuate the card lever in the card feeding path which is provided just the same as the card lever 206 for the record sheet feeding path which, however, for reasons of clarity has been omitted in the drawings. The card lever closes its contact $k^2$. After the card lever contact has closed the start key $st$ can be released. The motor now receives current through the contacts $m$, $a_{II}$ and $k^2$. At the same time the contact $n^1$ will be closed through cam 95 (Fig. 11).

Shortly thereafter when the first position is above the brushes $b_{II}$ also the contact $i$ (Fig. 5) will close so that now current will flow from negative through the contacts $m$, $k^1$, $k^2$, $i$, $n^1$, the brushes $b_{II}$ having passed through a hole, through the associated magnets D, the contacts $to$, $u^1$ and $u^2$ to positive. According to the perforation the clutch magnets D respond and clutch the associated type wheels to the drive of the printing mechanism. Before the card is shifted to the next position the contact $i$ opens and interrupts the current circuit through the brushes so that the same open without current and no sparking can arise. Upon the next position the contact $i$ closes again thereby energizing the clutch magnets D in accordance with the perforation. As soon as the last position of the first deck has been analyzed, the contact $n^1$ opens thereby interrupting the current circuit through the brushes during deck change. During deck change the cam contact $n^2$ closes by means of which the printing magnet $H^1$ for the card printing receive current through the contact $a_I$ thus being energized. As has been described above herewith printing of one line takes place. Before the next deck passes under the analyzing device the cam contact $n^2$ again interrupts the current circuit.

During deck change from the first to the second deck the contact $u^1$ is shifted through the cam disk 231 (Fig. 11) so that now current will no longer flow through the contacts $to$ but through $tm$. When the first position of the second deck has reached the brushes $b_{II}$ contact $n^1$ closes and the analyzing cycle described above begins anew but with the difference that now current does not flow through the contacts $to$ but through the contacts $tm$. The same applies in a similar manner to the change from the second to the third deck. During this change the contact $u^2$ shifts and the current then flows through the contacts $tu$. The contacts $tm$ and $tu$ are interrupted in accordance with the desired column eliminations in the second or third deck respectively. If now the card has been analyzed and card change takes place the two contacts $u^1$ as well as $u^2$ are again in the home position and the operating cycle will begin anew.

If certain columns being punched in the card are not to be printed on, the contacts associated with the columns, that is to say the contacts $to$ for the upper deck, $tm$ for for the middle deck and $tu$ for the lower deck are interrupted by the keys 144 (Figs. 12 and 13) so that no current can flow through the magnets D associated with the columns, though there is a perforation provided.

If now instead of the cards the record sheet is to be printed upon, the printing mechanism is moved from the card printing position to the record sheet printing position. Hereupon the contact $a_\mathrm{I}$ will shift and contact $a_\mathrm{II}$ will be opened which is under $a_\mathrm{I}$ in Fig. 12 and which has been omitted for reasons of clarity in the drawing. The contact $a_\mathrm{I}$ will now no longer supply the current through the printing magnet $H^1$, but through the magnet $H^2$ which actuates the printing hammer below the record sheet. Since the contact $a_\mathrm{II}$ has opened the current must now flow through the card lever contact $k^1$. The latter is, as has already been described above, only closed if there is a record sheet or if there are envelopes in the sheet feeding path. This not being the case the whole current circuit is interrupted and the machine will be stationary.

As has already been described above comparing of the group number with the following card takes place during the analysis of the second deck. If now the second deck is analyzed the contact $u^1$ is shifted and current does not flow only through the printing magnets D but also through the group control relays G. The group control relays are in the form of differential relays and have two coils acting magnetically upon each other. Accordingly they will respond if current flows only through one of the two windings. If current flows through both windings they do not respond. If the following card has the same group number current flows through both windings of the group control relays so that the same do not respond. Consequently their contacts $g$ remain closed. If the toothed segment 162 is disengaged from the idle wheel 163 (Fig. 11) the cam contact $n^3$ temporarily closes thereby energizing the clutch magnet K and rocking the idle wheel 163 downwardly and disconnecting the long feed. At the same time the clutch magnet K closes its contact $k$ thereby establishing a holding circuit through the contacts $n^4$, $k$ and $g$. Through the latter the clutch magnet K remains energized until the cam contact $n^4$ opens instantaneously which is effected just before closing of the cam contact $n^3$ which means in the time during which the toothed segment 163 is disengaged.

If, however, the following card has a different group number, then in one or a plurality of group control relays current will flow through one winding only so that the relays will respond and will open their contacts $g$. Thereby the holding circuit through the clutch magnet K is interrupted so that the clutch magnet will again be de-energized after opening of the cam contact $n^3$, rocks the gear 163 upwardly and continues the drive for the long feed.

When the supply magazine is emptied the card lever $k^2$ opens, thereby interrupting the current circuit through the machine. The same will happen if the receiving magazine is filled in which instance the magazine contact $n$ opens.

*Modifications*

The invention idea may be modified in different ways. In the described embodiment the printing mechanism is displaced in the axial direction. It could however just as well be displaced in the horizontal or vertical direction. A further appropriate construction results if the printing mechanism is not bodily displaceable at all but only requires to change its zero position for the two printing positions. It is particularly easy to obtain this with a type wheel printing mechanism by turning the wheels into a different zero position as is illustrated in a further embodiment shown in Figs. 14 to 16. With the following exception the general construction as well as the wiring of the second embodiment are similar to the first embodiment. Accordingly, in the following description only the modifications and changes with regard to the first embodiment are referred to. The parts serving the same functions as in the first embodiment are designated by the same reference numbers as in the first embodiment.

Fig. 14 shows an arrangement in which the card and record card feeding path are not offset laterally relatively to each other so that the machine is only as broad as corresponds to the largest width of the record sheet. With this arrangement the sheet is not fed under the printing mechanism but at the left hand side of the same (Fig. 14) and is printed upon by means of the printing hammer 241. The cards however are fed past the lower side of the printing mechanism and are printed there by means of the printing hammer 214. In accordance with the position of the two printing hammers 214 and 241 the zero position of the type wheels is changed depending on the card or sheet print. This change can be effected in a simple manner thereby that the position of the zeroizing shaft 82 is changed for a certain angle in counterclockwise direction with respect to its drive. The zeroizing shaft then takes with it the type wheels for the respective amount thereby varying the zero position. Therefore the type indicative of the controlling holes will be set in either one of the two printing positions. The printing hammer 214 in Fig. 14 for printing upon the record card corresponds to the printing hammer 214 in Fig. 7. The printing hammer 241 in Fig. 14 for printing upon the record sheet is actuated in a similar manner as the printing hammer 221 in Fig. 13. Due to this similarity it will also be recognized that the same wiring diagram applies to the second embodiment as to the first mentioned embodiment.

This displacing device is shown in Figs. 15 and 16. In order to change for instance the setting from sheet printing to card printing the hand wheel 242 mounted on the bolt 243 is depressed against the disk 244 having two borings 245. The two studs 246 of the hand wheel then project into the borings 245. During the rotation of the hand wheel in counterclockwise direction the same takes with it through studs 246 the disk 244 seated together with the gear 247 on the sleeve 248. As soon as the detent spring 249 engages the notch 252 the displacement is finished and the hand wheel can again be released. By means of a pressure spring 253 the hand wheel 242 is pressed outwardly and is thus separated from the disk 244. The gear 247 meshes with the gear 96; it has the same number of teeth as the gear 98 seated on the sleeve 82 (Fig. 14) and causing the displacement of the type wheels. The relative position of part 82 may be recognized from Fig. 7 and that of parts 93, 96, 97 and 98 may be seen in Fig. 11.

The zeroizing device must be displaced by the hand wheel 242 in one direction only. Turning in opposite direction is prevented by the detent spring 249.

I claim:

1. In a record card controlled printing machine, in combination, means for feeding along a first path record cards bearing marks; analyzing means for said marks arranged in said first path; means for feeding a record sheet along a second path; a printing mechanism controlled by said analyzing means and being set by the same for printing data represented by marks on said record cards; and control means for selectively associating said printing mechanism with each of said paths for selectively printing on said record cards and on said record sheet, respectively.

2. In a record card controlled printing machine, in combination, means for feeding along a first path record cards bearing marks; analyzing means for said marks arranged in said first path; means for feeding a record sheet along a second path; a printing mechanism controlled by said analyzing means and being set by the same for printing data represented by marks on said record cards, said printing mechanism being common to said record cards and to said record sheet and being movable between a first position located in said first path and a second position located in said second path; and control means for shifting said printing mechanism between said first and second positions for selectively printing on said record cards and on said record sheet, respectively.

3. In a record card controlled printing machine, in combination, means for feeding along a first path record cards bearing marks; analyzing means for said marks arranged in said first path; means for feeding a record sheet along a second path; a printing mechanism controlled by said analyzing means and being set by the same for printing data represented by marks on said record cards, said printing mechanism being common to the record cards and to the record sheet and being movable between a first printing position located in said first path, and a plurality of second printing positions located in said second path for printing on said record sheet in a selected printing position of said second printing positions.

4. In a record card controlled printing machine, in combination, means for feeding along a first path record cards bearing marks; analyzing means for said marks arranged in said first path; means for feeding a record sheet along a second path parallel to said first path; a printing mechanism controlled by said analyzing means and being set by the same for printing data represented by marks on said record cards, said printing mechanism being common to the record cards and to the record sheet and being movable in a direction transverse to the direction of said parallel first and second paths between a first printing position located in said first path, and a plurality of transversely spaced second printing positions located in said second path for printing on said record sheet in a selected printing position of said second printing positions.

5. In a record card controlled printing machine, in combination, means for feeding along a first path record cards bearing marks; analyzing means for said marks arranged in said first path; means for feeding a record sheet along a second path; a printing mechanism controlled by said analyzing means and being set by the same for printing data represented by marks on said record cards, said printing mechanism being common to said record cards and to said record sheet and being movable between a first position located in said first path and a second position located in said second path; control means for shifting said printing mechanism between said first and second positions for selectively printing on said record cards and on said record sheet, respectively; and means for rendering said printing device inoperative in an intermediate position between said first position and said second position.

6. In a record card controlled printing machine the combination of means for analyzing record cards, printing mechanism operable under the control of said analyzing means, said printing mechanism including a plurality of type carriers each selectively movable in a circular path under control of the analyzing means from a datum position to a position in which the selected type is positioned for printing, means for feeding a record card past the analyzing means to a first printing station, means for feeding printing-receiving material to a second printing station offset angularly around the path of the type carriers from the card printing station, and means for angularly displacing the datum position of the type carriers to an extent equal to the amount by which the second printing station is angularly offset from the first printing station.

7. A record card controlled printing machine as set forth in claim 6 and including a resetting shaft; type wheels connected to said resetting shaft for being turned by the same into printing positions selected in such manner that the zero position of said type wheels is located at said first printing station opposite the controlling record cards and at the second printing station opposite a printing place for said print-receiving material.

8. A record card controlled printing machine as set forth in claim 6 and including a carrier for the print-receiving material, said carrier being shiftable with respect to said printing mechanism for varying the printing position of the same with respect to said print-receiving material.

References Cited in the file of this patent
UNITED STATES PATENTS

| | | |
|---|---|---|
| 606,743 | Stallman | July 5, 1898 |
| 1,229,202 | Potts | June 5, 1917 |
| 1,608,837 | Bryce | Nov. 30, 1929 |
| 1,823,262 | Ferrera | Sept. 15, 1931 |
| 1,938,663 | Long | Dec. 12, 1933 |
| 1,946,900 | Daly | Feb. 13, 1934 |
| 1,946,915 | Pierce | Feb. 13, 1934 |
| 2,002,437 | Maul | May 21, 1935 |
| 2,013,533 | Buhler | Sept. 3, 1935 |
| 2,016,709 | Eichenauer | Oct. 8, 1935 |
| 2,093,545 | Bryce | Sept. 21, 1937 |
| 2,242,242 | Buhler | June 3, 1941 |
| 2,352,802 | Ryan | July 4, 1944 |